United States Patent [19]
Lema et al.

[11] Patent Number: 5,733,485
[45] Date of Patent: Mar. 31, 1998

[54] ELIMINATION OF SURFACE IRREGULARITIES ON THE WRAPAROUND WINDOW OF A TORPEDO NOSE ARRAY

[75] Inventors: Luis E. Lema, North Attleboro, Mass.; Thomas A. Galib, Portsmouth, R.I.

[73] Assignee: The United States of America as represented by the Secretary of the Navy, Washington, D.C.

[21] Appl. No.: 703,234

[22] Filed: Aug. 26, 1996

[51] Int. Cl.$^6$ .................................................. B32B 35/00
[52] U.S. Cl. ........................... 264/36; 264/40.1; 264/102; 264/344; 264/346; 156/344
[58] Field of Search ..................... 264/36, 102, 344, 264/346, 40.1; 156/344

*Primary Examiner*—James Derrington
*Attorney, Agent, or Firm*—Michael J. McGowan; Robert W. Gauthier; Prithvi C. Lall

[57] ABSTRACT

The present invention relates to a method for eliminating surface irregularities on the wraparound window of a torpedo nose array. The method broadly comprises the steps of preheating an oven to a temperature in the range of from about room temperature to about 160° F., placing the nose array with the surface irregularities in the preheated oven, applying a vacuum at a pressure of up to about 10 mm of mercury, and maintaining the object in the oven under the conditions of temperature and pressure for a time sufficient to cause polymerization at the surface of the object and removal of gas bubbles, waves and blisters from the surface of the nose array. The method further comprises introducing an anhydrous gas such as nitrogen into the oven during the vacuum applying step.

12 Claims, No Drawings

ELIMINATION OF SURFACE IRREGULARITIES ON THE WRAPAROUND WINDOW OF A TORPEDO NOSE ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a method for repairing irregularities on the polymer surface of an object. The method has particular utility in eliminating accumulated gas bubbles and anomalous protuberances on the surface of the nose array of a torpedo.

2. Description of the Prior Art

Surface damage, in the form of waves and blisters, has been observed on the polymer surface material of nose arrays on torpedoes. These irregularities are usually located on the upper hemisphere (nine to three position) of the nose array surface. The waves tend to be circumferential and tend to be separated longitudinally by about ½ to ¾ inch. The blisters show a similar separation and have observed diameters between 1/32 and ⅛ inch. Further, the blisters have the appearance of chicken pox. The presence of these irregularities is detrimental to the noise performance of the nose array.

The blistered nose arrays have been observed in storage bunkers, aboard submarines and at intermediate maintenance activity centers where minor repairs to the torpedoes are performed. This suggests that the cause of the problem is environmental in nature, specifically the physical, chemical and physicochemical environments in which the arrays are stored and used.

The most likely physical cause of the waves and blisters is the presence of voids in the polyurethane material which forms the nose array. These voids are formed during the contour machining of the nose array window. Subsequent variation of the contour surface is due to filling of the voids, distortion of the voids, or a combination of the two.

The chemical sources of the problem appear to be related to an imbalance in the required stoichiometric amount of the two chemical components used to prepare the polyurethane material. The two chemical components are an isocyanate prepolymer and a polyglycol. If these materials are not well mixed, the resulting polyurethane can show areas that are higher in either material than the expected concentration. The chemical imbalance may also result from using more than the expected amount of either material in the mixture preparation. The blister formation on the surface of the array is believed to be the result of the formation and subsequent accumulation of carbon dioxide gas aided by the positive ambient pressure within a submarine-environment. Carbon dioxide gas is believed to emanate from the exposure of the prepared polyurethane material to water.

The waves on the nose array surface are believed to be related to the accumulation of impurities inside the minute voids that are formed in the matrix of the polyurethane during machining. These voids may subsequently be sealed by plasticizer that diffuses from the cover mounted over the nose array into the surface of the array. The size and shape of the voids in the polyurethane material are dependent on several factors.

When the nose array is submerged, seawater gets inside the open voids of the polyurethane material and becomes trapped inside the voids if they are sealed before the water evaporates. Sealing of the voids may occur by the action of the plasticizer found in the array cover. When the nose array is then exposed warm temperatures, water vapor forms within the sealed voids and produces blisters on the surface of the array. The plasticizer is believed to accelerate the closing of the filled pores by plasticizing the walls of the open pores.

Organic materials may also become trapped within the voids in the same manner as seawater. Some of these materials, such as cooking oil and soaps containing high surface agent compounds, are used either at the maintenance facilities or aboard submarines. For example, a high surface agent soap is used to clean nose arrays prior to covering them.

Other causes of the surface irregularities are due to physicochemical effects which are conditions that appear to be chemical but are actually physical. These include temporary changes in the shape of the nose array surface caused by such actions as applying the nose cover to the array. The surface anomalies that result are reversible. The original array shape may be recuperated by applying physical treatments to the nose array surface. It is believed that physicochemical effects are the most likely explanation for the waves and blisters.

In the past, the problem of waves and blisters on the surface of the torpedo nose arrays was resolved by conducting a complete refurbishing of the array. This consisted of peeling and removing the polyurethane from the surface of the nose array and applying a new layer of polymer. Once the new polymer was applied, it was necessary to dye and machine it.

In the field, the problem has been dealt with by removing the cover from the stored torpedoes at room temperature. As time progresses, the waves and the blisters decrease in height and, in most cases, eventually disappear. However, at times there remain spots at the locations of the old irregularities. These spots are detrimental to the performance of the nose array.

Consequently, there remains a need for a technique for handling and eliminating the waves and blisters that form on the surface of the nose arrays.

SUMMARY OF THE INVENTION

Accordingly, it is an object of the present invention to provide a method for repairing irregularities on the polymer surface of an object.

It is a further object of the present invention to provide a method as above which has particular utility in eliminating waves and blisters on the surface of a polyurethane nose array used on torpedoes.

It is yet another object of the present invention to provide a process as above which may be performed in the field.

Still further, it is an object of the present invention to provide a method as above which eliminates the need to totally refurbish the array, which is economically inexpensive, and which does not create waste material that requires specialized disposal.

The foregoing objects are attained by the method of the present invention.

In accordance with the present invention, the method for repairing irregularities on the polymer surface of an object, such as the polyurethane nose array on a torpedo, comprises the steps of: preheating an oven to a temperature in the range of from about room temperature to about 160° F.; placing the object with the surface irregularities in the preheated oven; applying a vacuum at a pressure of up to about 10 mm of mercury; and maintaining the object in the oven under the conditions of temperature and pressure for a time sufficient to cause polymerization at the surface of the object, removal of gas bubbles, or elimination of waves and blisters from the surface. In a preferred embodiment of the present invention, an anhydrous inert gas such as nitrogen is bled into the oven during the vacuum applying step to speed up the remedial process.

Other details of the method of the present invention, as well as other objects and advantages attendant thereto, are set forth in the following detailed description.

DESCRIPTION OF THE PREFERRED EMBODIMENT

In accordance with the present invention, the waves and blisters present on the surface of the nose arrays are eliminated by conducting a combination of oven heating and vacuum application to the nose arrays. To perform the method of the present invention, an oven with enough capacity to accommodate a nose array is required. The oven should have the ability to maintain a temperature of about 160° F. The oven should also be equipped to pull a vacuum so as to maintain an overall pressure within the oven of about 1.0 to about 10 mm of mercury. Still further, the oven should have a small penetration at the bottom to allow the injection of a small bleed of an anhydrous gas such as nitrogen. Any conventional oven known in the art which meets these criteria can be used to perform the method of the present invention.

Before being placed in the oven, the polyurethane nose array is removed from the torpedo. Additionally, the cover which is normally positioned over the nose array is removed from the surface of the nose array. This helps prevent the migration of plasticizer from the cover to the surface of the nose array.

Thereafter, the oven is preheated to a temperature in the range of from about 70° F. to about 160° F. It has been found that particularly good results are obtained when the temperature is close to 160° F. After the oven has been preheated to the desired temperature, the polyurethane nose array is placed within the oven.

A vacuum is then applied to the oven. The vacuum that is applied should keep the pressure in the oven at a level of up to about 10 mm of mercury, preferably the vacuum maintains an overall pressure within the oven of from about 1.0 to about 10 mm of mercury.

While the vacuum is being applied, an anhydrous gas may be bled into the oven. The anhydrous gas may be bled into the oven at any desired rate, preferably, once the vacuum of 10 mm Hg is readied, the gas supply valve is cracked open and the pressure is observed until a loss of vacuum equivalent to 1 mm Hg is observed. The gas supply valve is then closed to a position half way between the cracked open position and fully closed position.

The nose array is maintained within the oven under the aforementioned conditions of temperature and pressure for a time sufficient to cause polymerization at the surface of the object and removal of the gas bubbles, waves, blisters, and any other irregularities from the surface. Generally, the polyurethane nose array is maintained within the oven under the conditions of temperature and pressure for a time of at least about 8 hours. Typically, the time period will be in the range of from about 8 to about 48 hours. Preferably, the time for which the nose array is exposed to the conditions of temperature and pressure is from about 8 to about 24 hours. While the method of the present invention normally does not require the nose array to be maintained within the oven for a time greater than 48 hours, the exposure time may be extended if necessary to remove all of the surface irregularities. While the nose array is inside the oven, samples of the exhaust gas leaving the oven should be taken. The samples may then be analyzed by gas chromatograph/mass spectrometry for the following gases: carbon dioxide, xylene and hydrocarbons, water and air. These analyses can be used to determine the source of blistering and also to monitor the outgassing of impurities from the nose array.

If desired, prior to placement of the nose array within the oven, the beam patterns of the nose array can be measured to determine initial nose array characteristics. Following the beam pattern measurements, all of the functional item replacement components are removed from the nose array. After the surface irregularities have been eliminated by the method of the present invention, the functional item replacement components may be reinstalled in the nose array and the beam pattern measurements repeated for comparison with the initial results.

Still further, the nose array may be photographed prior to placement in the oven to assess the condition of the blistered areas prior to the elimination process. Following completion of the elimination process, the nose array may be photographed again for comparison purposes.

The method of the present invention has been found to effectively eliminate gas bubbles and other anomalous protuberances on the surface of polyurethane nose arrays. This is believed to be the result of achieving a high degree of polymerization at the surface of the polyurethane material. The method of the present invention speeds up gas removal while at the same time increasing the degree of polymerization.

The method of the present invention is advantageous in that it eliminates the need for total refurbishment of the array, which refurbishment is expensive and creates waste material that requires a specialized form of disposal. The method is further advantageous in that it can be conducted locally at maintenance facilities, whereas the prior art procedure of totally refurbishing the nose array requires the transportation of the nose array to a separate facility.

It is apparent that there has been provided in accordance with this invention a method for eliminating surface irregularities on the wraparound window of a torpedo nose array which fully satisfies the objects, means, and advantages set forth hereinbefore. The intermediate maintenance activities have the necessary ovens and equipment to perform the heating and vacuum application method described. Use of the method of the present invention eliminates the total refurbishment of the nose array with its attendant disposal problems and significantly reduces costs when compared to total refurbishment.

While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for repairing irregularities on a polyurethane surface of an object, said method comprising the steps of:

preheating an oven to a temperature in the range of from about 70° F. to about 160° F.;

placing said object with said surface irregularities in said preheated oven;

applying a vacuum at a pressure of up to about 10 mm of mercury; and maintaining said object in said oven under said conditions of temperature and pressure for a time sufficient to cause polymerization at the surface of said object and removal of gas bubbles, waves and blisters from said surface.

2. The method of claim 1 further comprising the step of introducing an anhydrous gas into said oven during said vacuum applying step.

3. The method of claim 2 wherein said anhydrous gas introducing step comprises bleeding nitrogen gas into said oven during said vacuum applying step.

4. The method of claim 3 wherein said bleeding step comprises initiating a flow of said nitrogen gas when the vacuum in said oven is at about 10.00 mm mercury, continuing said flow of said nitrogen gas until a loss of vacuum equivalent to about 1 mm Hg is observed, and then reducing the flow of said nitrogen gas.

5. The method of claim 1 wherein said maintaining step comprises maintaining said object in said oven under said conditions of temperature and pressure for a time period of at least about 8 hours.

6. The method of claim 1 wherein said maintaining step comprises maintaining said object in said oven under said conditions of temperature and pressure for a time period in the range of from about 8 to about 48 hours.

7. The method of claim 1 wherein said maintaining step comprises maintaining said object in said oven under said conditions of temperature and pressure for a time period in the range of from about 8 to about 24 hours.

8. The method of claim 1 wherein said object is a nose array on a torpedo and wherein said method further comprises the step of removing a protective cover from said nose array prior to introducing said nose array into said oven so as to prevent any migration of plasticizer from said cover into the nose array while said nose array is exposed to said conditions of temperature and pressure.

9. The method of claim 1 wherein said vacuum applying step comprises applying a pressure in the range of from about 1.0 to about 10.0 mm of mercury.

10. A method for removing irregularities from a surface of a polyurethane nose array comprising the steps of:

removing a protective cover from said nose array surface so as to prevent migration of plasticizer from the cover to the nose array;

placing said nose array in an oven at a temperature in the range of from about 70° F. to about 160° F.; applying a pressure in the range of from about 1.0 to 10.0 mm of mercury to said oven;

introducing an anhydrous gas into said oven; and maintaining said nose array in said oven for a time sufficient to remove said surface irregularities.

11. The method of claim 10 further comprising:

taking samples of exhaust gases leaving said oven; and analyzing said exhaust gases for the presence of carbon dioxide, xylene, hydrocarbons, water and air.

12. The method of claim 11 wherein said analyzing step is performed by gas chromatograph/mass spectrometry.

\* \* \* \* \*